United States Patent
Wang

(10) Patent No.: US 9,104,685 B2
(45) Date of Patent: Aug. 11, 2015

(54) METHOD, DEVICE AND STORAGE MEDIUM FOR CLEANING UP FILE SYSTEMS

(75) Inventor: Yongxin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/235,402

(22) PCT Filed: Jun. 28, 2012

(86) PCT No.: PCT/CN2012/077694
§ 371 (c)(1),
(2), (4) Date: Jan. 27, 2014

(87) PCT Pub. No.: WO2013/013553
PCT Pub. Date: Jan. 31, 2013

(65) Prior Publication Data
US 2014/0149472 A1 May 29, 2014

(30) Foreign Application Priority Data
Jul. 25, 2011 (CN) .......................... 2011 1 0208944

(51) Int. Cl.
*G06F 17/30* (2006.01)
*G06F 21/60* (2013.01)
*G06F 3/06* (2006.01)

(52) U.S. Cl.
CPC ........ *G06F 17/30138* (2013.01); *G06F 3/0623* (2013.01); *G06F 3/0652* (2013.01);
(Continued)

(58) Field of Classification Search
CPC .................. G06F 2221/2143; G06F 17/30117; G06F 21/6218; G06F 3/0652; G06F 2212/7205; G06F 17/30303; G06F 12/0253; G06F 17/30138; G06F 3/0623; G06F 3/0674; G06F 21/60
USPC .................................................. 707/736, 813
See application file for complete search history.

(56) References Cited

U.S. PATENT DOCUMENTS 6,314,437 B1 * 11/2001 Starek et al. .......................... 1/1
8,516,212 B2 8/2013 Sasaki
(Continued)

FOREIGN PATENT DOCUMENTS

CN 1910561 A 2/2007
CN 102096644 A 6/2011
(Continued)

OTHER PUBLICATIONS

Microsoft Article ID: 314834: "How to Clear the Windows Paging File at Shutdown" (Article ID: 314834—KB314834, published: Jul. 20, 2010. Available at http://support.microsoft.com/kb/314834).*
(Continued)

*Primary Examiner* — Jean B Fleurantin
*Assistant Examiner* — Evan Aspinwall
(74) *Attorney, Agent, or Firm* — Marshall, Gerstein & Borun LLP

(57) ABSTRACT

Examples of the present disclosure may provide a method, device and storage medium for clearing up a file system. A volume may be opened and locked according to a clearing-up instruction. The clearing-up instruction may indicate the volume which is to be cleared up. Garbage information on a disk corresponding to the volume may be cleared up. The volume may be unlocked after the garbage information is cleared up. The device may include a locking module, a clearing-up module and an unlocking module. With the example of the present disclosure, when the clearing-up instruction is received, the garbage information on the disk corresponding to the volume may be cleared up. Therefore, the privacy of the user remained in the file system may be thoroughly cleared up, the leakage of the privacy of the user may be avoided and the security of the file system may be enhanced.

10 Claims, 5 Drawing Sheets

(52) U.S. Cl.
CPC ........ *G06F3/0674* (2013.01); *G06F 17/30117* (2013.01); *G06F 21/60* (2013.01); *G06F 2221/2143* (2013.01)

(56) References Cited

U.S. PATENT DOCUMENTS

| | | | |
|---|---|---|---|
| 2006/0277183 A1* | 12/2006 | Nichols et al. | 707/9 |
| 2007/0233936 A1* | 10/2007 | Chu | 711/103 |
| 2008/0010326 A1 | 1/2008 | Carpenter et al. | |
| 2008/0235301 A1* | 9/2008 | Wright et al. | 707/205 |
| 2011/0264884 A1* | 10/2011 | Kim | 711/170 |

FOREIGN PATENT DOCUMENTS

| | | |
|---|---|---|
| EP | 1 717 709 A1 | 11/2006 |
| JP | 63-307555 | 12/1988 |
| JP | 10-283320 | 10/1998 |
| JP | 2004355640 A | 12/2004 |
| JP | 2005222483 A | 8/2005 |
| JP | 2006285867 A | 10/2006 |
| JP | 2007149071 A | 6/2007 |
| JP | 2008511072 A | 4/2008 |
| JP | 2008146514 A | 6/2008 |
| JP | 2009163529 A | 7/2009 |
| WO | WO-2006/023196 A2 | 3/2006 |
| WO | WO-2010/109774 A1 | 9/2010 |

OTHER PUBLICATIONS

International Search Report for PCT/CN2912/077694 dated Sep. 20, 2012.

Extended European Search Report for Application No. 12817785.4, dated Nov. 21, 2014.

Hirotaka Tsuboyama, HDD & DVD Perfect Guide, PC Japan, Japan, Softbank Creative Co., Ltd., Jun. 1, 2008, vol. 13, No. 6, Issue 135, pp. 36-41.

Notice of Reasons for Rejection in JP Application No. 2014-521917 dated Feb. 9, 2015, 7 pages.

* cited by examiner

METHOD, DEVICE AND STORAGE MEDIUM FOR CLEANING UP FILE SYSTEMS

FIELD OF THE INVENTION

The present disclosure relates to a file system field, and more particularly, to a method, device and storage medium for cleaning up a file system.

BACKGROUND

Various temporary files may be generated when the windows is operated. The temporary files may include user information kept in a web browser and records relating to privacy of the user, such as traces of office software. In the conventional method, the privacy of the user generated by using the web browser and a variety of software may be cleaned up.

However, in the conventional Operating System (OS), privacy information of the user may also be generated in a process of using the file system of the windows except for privacy information of the user generated in the process of using the web browser and the variety of software. For instance, a large amount of personal files may be stored in a disk of a computer and the personal files may include a large amount of privacy information of the user. If a computer used by a user is used by another person for some reasons (such as reassignment in a work unit), files stored in the computer may be deleted or the disk of the computer may be formatted. However, the files may not be thoroughly cleaned up by these operations. File data and data relating to the files may be hidden in the disk and a large amount of privacy information of the user may reside in the data. If data recovery software is used, all or partial of the data of the deleted file may be restored. Therefore, the privacy of the user in the data of the file may be likely to be leaked and file system may be insecure.

SUMMARY

Examples of the present disclosure may provide a method, device and storage medium for clearing up a file system, to enhance the security of the file system.

An example of the present disclosure may provide a method for clearing up a file system. The method may include:

opening and locking a volume according to a clearing-up instruction; wherein the clearing-up instruction indicates the volume which is to be cleared up;

clearing up garbage information on a disk corresponding to the volume; and unlocking the volume after clearing up the garbage information on the disk corresponding to the volume.

Another example of the present disclosure may provide a storage medium, storing a data processing program, to execute the method the examples of the present disclosure.

Another example of the present disclosure may provide a device for clearing up a file system. The device may include:

a locking module, to open and lock a volume according to a clearing-up instruction; wherein the clearing-up instruction indicates the volume which is to be cleared up;

a clearing-up module, to clear up garbage information on a disk corresponding to the volume; and an unlocking module, to unlock the volume after the clearing-up module clears up the garbage information.

Compared with the conventional method, in examples of the present disclosure, when the clearing-up instruction is received, the garbage information on the disk corresponding to the volume may be cleared up. Since the garbage information on the disk may include the deleted file or data relating to formatted volume, the data of the file including the privacy of the user remained in the file system may be thoroughly cleared up by clearing up the garbage information on the disk corresponding to the volume. The leakage of the privacy of the user may be avoided and the security of the file system may be enhanced.

DETAILED DESCRIPTION

The technical scheme in examples of the present disclosure may be described clearly and completely accompanying with figures of the examples of the present disclosure. The examples described hereinafter may be partial of examples in the present disclosure but not be all the examples. According to the examples in the present disclosure, other examples obtained by an ordinary skilled in the art of the present disclosure without creative works may be protected by the present disclosure.

In order to make objectives, technical solutions and advantages of the present invention more apparent, the present invention will be described in detail hereinafter with reference to accompanying drawings.

Before introducing a method for clearing up a file system in an example of the present disclosure, some knowledge relating to the present disclosure may be described hereinafter.

Figure 1:
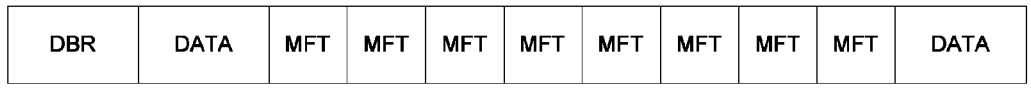
FIG. 1 is a schematic diagram illustrating structure of a New Technology File System (NTFS) file system.

FIG. 1 is a schematic diagram illustrating structure of a NTFS file system. Referring to FIG. 1, Dos Boot Record (DBR) may be a NTFS volume boot sector and may include boot information of a NTFS volume. DATA may be a data sector and may include data of various files and folders. A Master File Table (MFT) may be NTFS metadata and may be used for storing important information, such as attributes of NTFS volume information, files and folders. Each file in the NTFS may correspond to one or multiple (MFT)s. If the data of a file is small, the NTFS may store the data of the file in the MFT. When a file in the NTFS may be deleted by the windows, the following operations may be performed.

First, a byte in the MFT may be marked to denote that a file may have been deleted and MFT space may be released.

Second, an index in a parent folder may be cleared up.

Third, disk space occupied by the data of the file may be released from a bit table. The release of the disk space may not really clear up the disk space occupied by the data of the file, but may inform the file system to write new data in the disk space occupied by the file. The newly-written data may overwrite the original data.

In can be seen from the above that in the NTFS file system, user data which is not be cleared up by the windows may include: information occupied by a deleted file and the data of the file. The information occupied by the deleted file may include data stored in the MFT, such as a name of the file, time of the file and size of the file. The data stored in the MFT may include privacy of the user and may be likely to cause privacy leakage. The data of the file may include data in the DATA and the data of the file stored in the MFT. The data of the file may kept in the disk without being overwritten by new data and may be likely to cause the privacy leakage.

Since the file has been deleted, the user data which may not be cleared up may still be kept in the disk but may not be used again, the user data which may not be cleared up by the windows may also be called disk garbage information.

Figure 2:
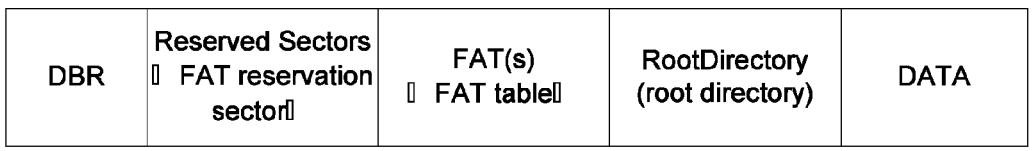
FIG. 2 is a schematic diagram illustrating structure of a File Allocation Table (FAT) file system.

FIG. 2 is a schematic diagram illustrating structure of a FAT file system. Referring to FIG. 2, DBR is a FAT volume boot sector and may include boot information of a FAT volume. Reserved Sectors may be a FAT reservation sector. FAT(s) may be a FAT table and may include directory entries. Each file may correspond to one directory entry. The directory entries may include information such as a name of a file, time of the file and size of the file. The data may also be called information occupied by the deleted file. RootDirectory may be a root directory and may be set in FAT12/FAT16. DATA may be a data sector. When a FAT file is deleted by the windows, following operations may be performed.

First, a directory entry of the file and the first byte of a long name of the file may be recorded as E5 to indicate that the file may be released.

Second, the space occupied by the data of the file may be cleared up from the FAT table.

It can be seen from the above that in the FAT file system, the user data which may not be cleared up by the windows may include: information occupied by the deleted file and data of the file. The information occupied by the deleted file may include data stored in the directory entry in the FAT, such as, the name of the file, time of the file and size of the file. Since the file has been deleted, the data of the user which may not be cleared up may still be kept in the disk but may not be used again, the data of the user which may not be cleared up by the windows may also be called disk garbage information.

In the NTFS file system or the FAT file system, data of a file may not be cleared up from the disk if the file is deleted. Instead, a mark may be added to the directory entry of the MFT or the FAT in a sector table to denote that the file may have been deleted. If new data is written in the disk, the system may overwrite the marked file with the new data. Therefore, when a file is deleted, the windows system may not thoroughly clear up the file, resulting in that the privacy of the user may be likely to be leaked.

Figure 3:
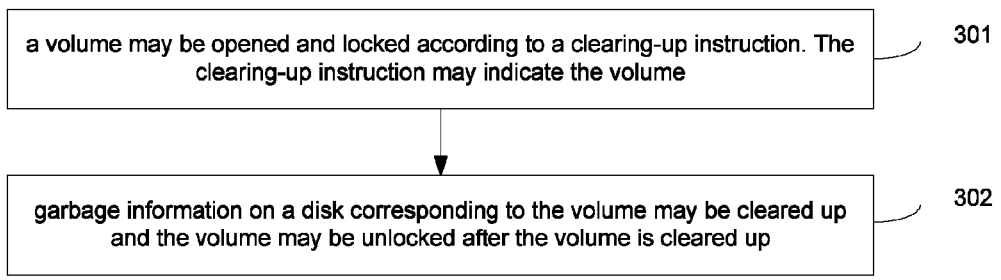
FIG. 3 is a flow chart illustrating a method for clearing up a file system in accordance with an example of the present disclosure.

In order to thoroughly clear up the data including the privacy of the user remained in the file system and avoid the leakage of the privacy of the user, an example of the present disclosure may provide a method for clearing up a file system. Referring to FIG. 3, the method may include following blocks.

In block 301, a volume may be opened and locked according to a clearing-up instruction. The clearing-up instruction may indicate the volume.

In block 302, garbage information on a disk corresponding to the volume may be cleared up and the volume may be unlocked after the volume is cleared up.

It may be well known by an ordinary skilled in the art that the volume may be a storage area on a hard disk. A drive may format the volume with a file system (such as the FAT or NTFS) and allocate a drive number for the drive. One hard disk may include many volumes. One volume may include many sub-volumes on many disks. The clearing-up operation in this example of the present disclosure may be performed for a volume in the computer. A user may designate the volume, for which the clearing-up operation may be performed. In this example of the present disclosure, when the user sends out the clearing-up instruction, selection options may be popped out and displayed to the user and the user may be asked to select a volume to clear up the volume.

In this example of the present disclosure, the file system may be changed. Therefore, when a volume is cleared up, the volume may be locked to ensure that no other file operation may be performed for the volume and avoid damage of the file system.

According to an example of the present disclosure, if the clearing-up instruction is sent out after a file in the volume is deleted, the method for clearing up the garbage information of the disk corresponding to the volume may include: clearing up the information occupied by the deleted file on the disk corresponding to the volume and erasing volume free space in the disk corresponding to the volume.

According to another example of the present disclosure, if the clearing-up instruction is sent out after the user performs a format operation on a volume, since the file system may clear up metadata in the file system after the file system formats the disk, the volume free space in the file system may be cleared up. Therefore, a method for clearing up the garbage information on the disk corresponding to the volume may include:

determining whether the volume specified by the clearing-up instruction is formatted and whether no file is added or deleted after the volume is formatted;

clearing up the volume free space in the disk corresponding to the volume if the volume specified by the clearing-up instruction is formatted and no file is added or deleted after the volume is formatted;

clearing up the information occupied by the deleted file on the disk corresponding to the volume and clearing up the volume free space in the disk corresponding to the volume if the volume specified by the clearing-up instruction is not formatted or a file is added or deleted.

The information occupied by the deleted file on the disk corresponding to the volume may include privacy of the user or trace of the user. In order to enhance the security, the information may need to be cleared up.

As for different file systems, the methods for clearing up the information occupied by the deleted file on the disk corresponding to the volume may be different.

In the NTFS file system, the information occupied by the deleted file may be stored in the MFT. The MFT may be an index of each file on the volume. The MFT may store a record called "attribute" for each file. Each attribute may store a different type of information. The information may include: a name of a file, time of the file and content of the file, etc. The time of the file may include creation time, modification time and last access time. The attribute may include the privacy of the user and trace of the user.

Therefore, in the NTFS file system, the method for clearing up the information occupied by the deleted file on the disk corresponding to the volume may include: traversing the MFT of the volume and clearing up the information occupied by the deleted file in the MFT. Since a mark may be added to a byte of the MFT corresponding to the file after the file is deleted to indicate that the file may be deleted, MFT information occupied by the deleted file may be found according to the mark in the MFT. The MFT information may include the name of the file, time of the file and content of the file, etc.

In the FAT file system, each file may correspond to a directory entry. The directory entry may include attribute information, such as the name of the file, time of the file and size of the file. The information occupied by the deleted file may be stored in the directory entry. When a FAT file is deleted by the windows, the directory entry of the file and the first byte of a long name of the file may be recorded as 0xE5. Therefore, an entry, in which the first byte of the name of the entry is 0xE5 in the directory entry may be information occupied by the deleted file.

Therefore, in the FAT file system, the method for clearing up the information occupied by the deleted file on the disk corresponding to the volume may include traversing the directory entry of the volume and clearing up the entry, in which the first byte of the name of the entry is 0xE5 in the directory entry.

In the volume free space of the disk corresponding to the volume, whether the file is deleted or the volume is formatted, the deleted file may not be thoroughly cleared up. In the contrary, a mark may be added to the directory entry of the MFT or the FAT of the file in the sector table to denote that the file may be deleted. However, the data of the file may be still stored in the disk. The space occupied by the file may be marked as free space. When a new file is written in the free space, the data in the free space may be overwritten by the new file. Therefore, when a file is deleted or a file is formatted, the data of the file in the free space may not be really cleared up, resulting in that the privacy of the user may be likely to be leaked.

Therefore, as noted above, in order to thoroughly clear up the data of the file including the privacy of the user in the file system and avoid the leakage of the privacy of the user, the volume free space in the disk corresponding to the volume may need to be cleared up. The volume free space may also be the garbage information on the disk. There may be two methods for clearing up the volume free space.

A first method for clearing up a volume free space may include: searching for a bit table of the volume in the file system and erasing disk space marked as free in the bit table. The bit table may indicate the free space of the volume. The space marked as free in the bit table may be the volume free space.

A second method for clearing up the volume free space may include: continuously creating temporary files on the disk corresponding to the volume until a failure occurs and clearing up the created temporary files. The created temporary files may overwrite the original data on the volume to avoid the leakage of the privacy of the user. It should be noted that due to the limit of the size of the temporary file, such as the size of the maximum file in the FAT32 file system is 4G, if the volume free space is larger than the limit of the file, the temporary file may need to be written in many times until a written-in operation may be failed. After the written-in operation may be completed, the effect may be achieved after all the written-in temporary files may be deleted.

Furthermore, in order to prevent the leakage of the privacy of the user, when the volume is a system disk, the method may further include: clearing up pagefile.sys. The method for clearing up the pagefile.sys may include: setting a value of a registry key HKLM\SYSTEM\CurrentControlSet\Control\Session Manager\Memory Management\ClearPageFileAtShutdown as 1, restarting the system and deleting the value of the key. It may be well known by an ordinary skilled in the art that the pagefile.sys may be virtual memory paging file created in an installation process. The pagefile.sys may save trace of the user which may relate to the privacy of the user. The size of the pagefile.sys may be a minimum value set according to the system virtual memory. It may be assumed that the virtual memory may be set as 800MB-1600MB, there may be the pagefile.sys of 800MB in a local drive disk.

It should be noted that the process for clearing up the pagefile.sys may be performed before the volume is unlocked or after the volume is unlocked, which may not be affected by the locking of the volume.

According to the method provided by this example of the present disclosure, the privacy of the user in the file system may be thoroughly cleared up via clearing up the garbage information on the disk corresponding to the volume after receiving the clearing-up instruction. Therefore, the leakage of the privacy of the user may be avoided and the security of the file system may be enhanced.

Figure 4:
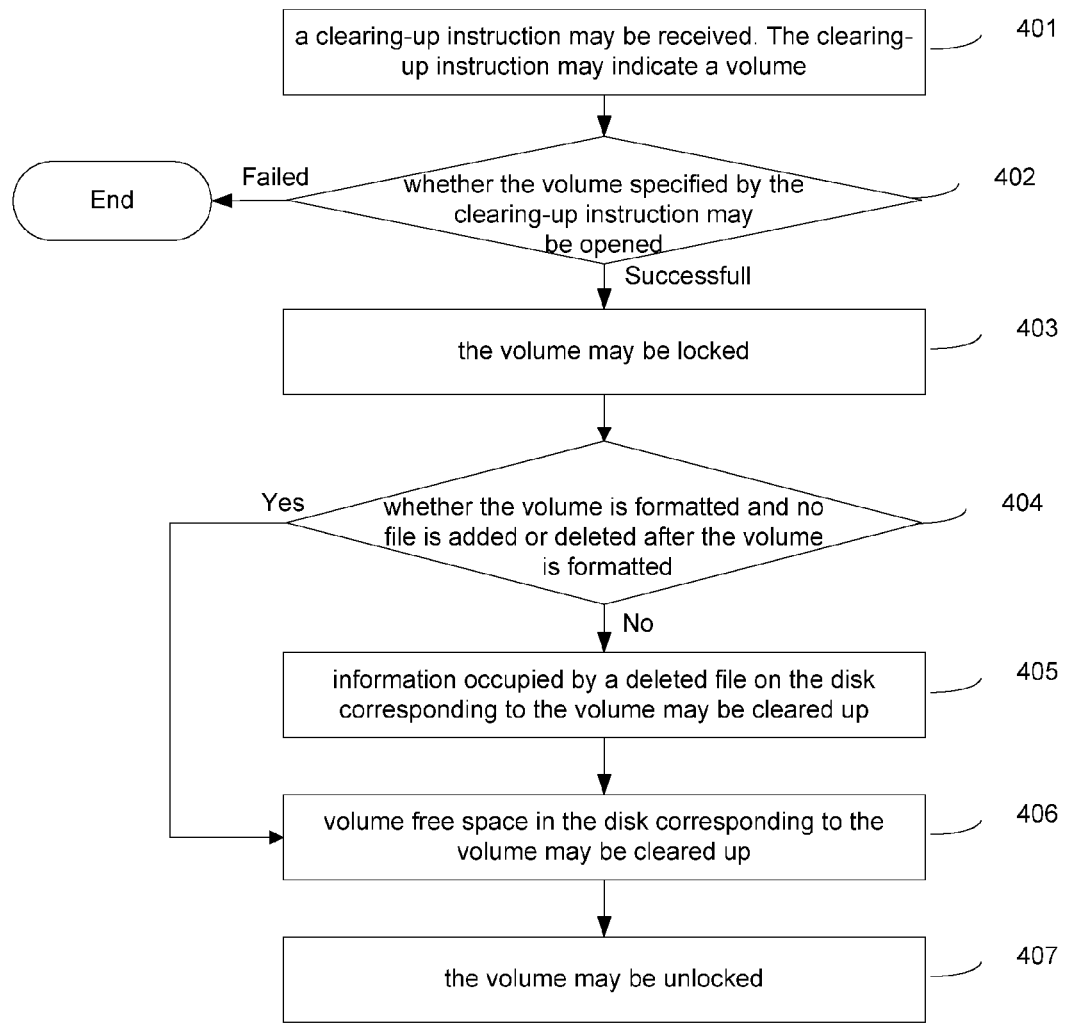
FIG. 4 is a flow chart illustrating a method for clearing up a file system in accordance with an example of the present disclosure.

FIG. 4 is a flow chart illustrating a system for clearing up a file system in accordance with an example of the present disclosure. Referring to FIG. 4, the method may include following blocks.

In block 401, a clearing-up instruction may be received. The clearing-up instruction may indicate a volume.

The clearing-up instruction may be triggered by a user, triggered by a file system at preset time intervals when an application is operated, automatically triggered after the user formats the volume, or triggered by the user after the user formats the volume and the user is prompted to trigger the clearing-up instruction.

In block 402, it may be determined whether the volume specified by the clearing-up instruction may be opened. If the volume may be opened, following blocks may be performed. If the volume may not be opened, the flow may be terminated.

The volume may be a volume which is to be cleared up. It may be well known by an ordinary skilled in the art that if the volume has been opened, an open failure occurs if an operation for opening the volume is performed.

In block 403, the volume may be locked.

It should be noted that since changes may be performed on the file system in the example of the present disclosure, the volume should be locked before the subsequent deletion operation, to ensure that no other file operation may be performed on the volume and avoid the damage of the file system.

It may be well known by an ordinary skilled in the art that the locking operation or unlocking operation performed on the file may be implemented by FSCTL_LOCK_VOLUME/FSCTL_UNLOCK_VOLUME control codes.

In block 404, whether the volume specified by the clearing-up instruction is formatted and no file is added or deleted after the volume is formatted may be determined. Block 406 may be performed if the volume specified by the clearing-up instruction is formatted and no file is added or deleted after the volume is formatted. Block 405 is performed if the volume specified by the clearing-up instruction is not formatted or a file is added or deleted.

There may be multiple determination methods in block 404. For instance, the formatting operation of the user may be monitored. A prompt of formatting and clearing-up instruction may be popped out after the volume is formatted by the user. The operation on the volume may be locked before the user triggers the formatting and clearing-up instruction. That is, the user may not add a new file to or delete a file from the volume. If the clearing-up instruction triggered by the user in block 401 may be the formatting and clearing-up instruction, it may be determined in block 404 that the volume specified by the clearing-up instruction may not be formatted and no file is added or deleted after the volume is formatted. It may be well known by an ordinary skilled in the art of the present disclosure that there may be other determination methods according to the description of block 404. For instance, the determination may be performed according to an inherent Application Programming Interface (API) of the OS, which may not be repeated here.

In block 405, information occupied by a deleted file on the disk corresponding to the volume may be cleared up.

In block 405, in the NTFS file system, the method for deleting the information may include traversing the MFT of the volume and clearing up the information occupied by the deleted file in the MFT. In the FAT file system, the method for deleting the information may include traversing a directory entry of the volume and clearing up an entry, in which the first byte of the name of the entry is 0xE5 in the directory entry.

In block 406, volume free space in the disk corresponding to the volume may be cleared up.

There may be two methods for clearing up the volume free space.

A first method for clearing up the volume free space may include querying a bit table of the volume in the file system and erasing disk space marked as free in the bit table.

A second method for clearing up the volume free space may include continuously creating temporary files on the disk corresponding to the volume until a failure occurs and clearing up the created temporary files.

In block 407, the volume may be unlocked.

After the clearing-up operation is finished, the unlocking operation may be performed on the volume to perform the subsequent operation.

According to the example provided by the present disclosure, when the clearing-up instruction is received, the information occupied by the deleted file of the volume and the volume free space may be cleared up. Therefore, the privacy of the user in the file system may be thoroughly cleared up, the leakage of the privacy of the user may be avoided and the security of the file system may be enhanced.

Figure 5:
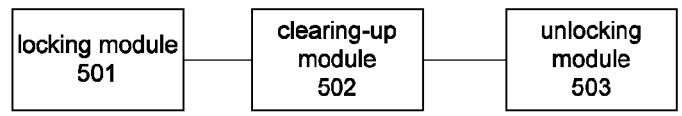
FIG. 5 is a schematic diagram illustrating a device for cleaning up a file system in accordance with an example of the present disclosure.

In order to thoroughly clear up trace of a user and avoid leakage of privacy of the user, an example of the present disclosure may further provide a device for clearing up a file system. Referring to FIG. 5, the device may include:

a locking module 501, to open and lock a volume according to a clearing-up instruction;

a clearing-up module 502, to clear up garbage information on a disk corresponding to the volume; and an unlocking module 503, to unlock the volume after the clearing-up module 502 clears up the garbage information. The clearing-up instruction may indicate the volume which is to be cleared up;

The garbage information on the disk corresponding to volume may include information occupied by a deleted file in volume free space of the volume and the volume free space in the disk corresponding to the volume.

Figure 6:
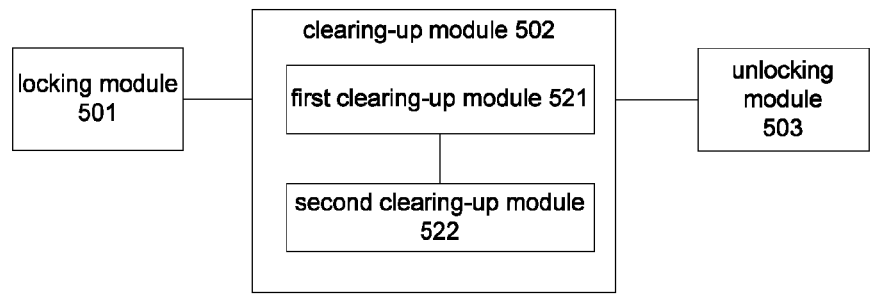
FIG. 6 is a schematic diagram illustrating structure of a device for cleaning up a file system in accordance with an example of the present disclosure.

According to an example, referring to FIG. 6, the clearing-up module 502 may include:

a first clearing-up module 521, to clear information occupied by the deleted file in the disk corresponding to the volume; and a second clearing-up module 522, to clear up volume free space in the disk corresponding to the volume.

Figure 7:
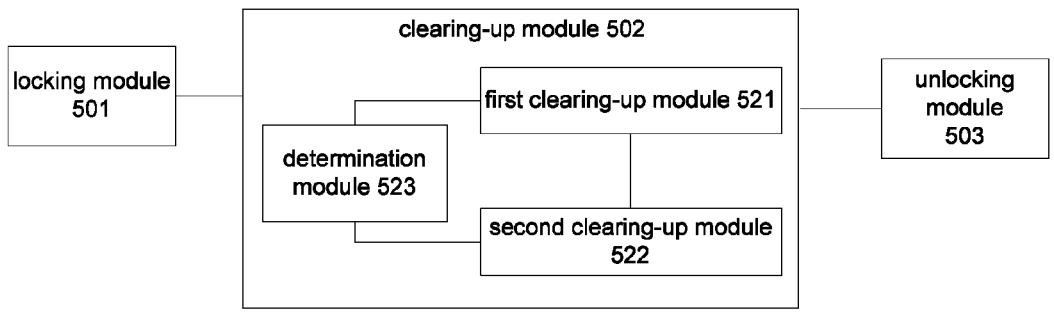
FIG. 7 is a schematic diagram illustrating another structure of a device for cleaning up a file system in accordance with an example of the present disclosure.

According to another example, referring to FIG. 7, in order to distinguish clearing-up methods, on the basis of FIG. 6, the clearing-up module 502 may further include:

a determination module 523, to determine whether the volume specified by the clearing-up instruction is formatted and no file is added or deleted after the volume is formatted, instruct the second clearing-up module 522 to clear up the volume free space in the disk corresponding to the volume if the volume specified by the clearing-up instruction is formatted and no file is added or deleted after the volume is formatted and instruct the first clearing-up module 521 to clear up the information occupied by the deleted file on the disk corresponding to the volume and instruct the second clearing-up module 522 to clear up the volume free space in the disk corresponding to the volume if the volume specified by the clearing-up instruction is not formatted or a file is added or deleted.

Figure 8:
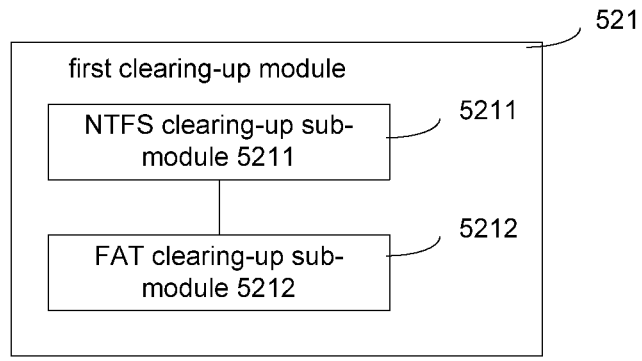
FIG. 8 is a schematic diagram illustrating structure of a first clearing-up module in accordance with an example of the present disclosure.

FIG. 8 is a schematic diagram illustrating structure of the first clearing-up module 521 in accordance with an example of the present disclosure. Referring to FIG. 8, the first clearing-up module 521 may include:

a NTFS clearing-up sub-module 5211, to traverse a MFT of the volume in a NTFS file system and clear up the information occupied by the deleted file in the MFT; and an FAT clearing-up sub-module 5212, to traverse a directory entry of the volume in a FAT file system and clear up an entry, in which the first byte of a name of the entry is 0xE5 in the directory entry.

Figure 9A:
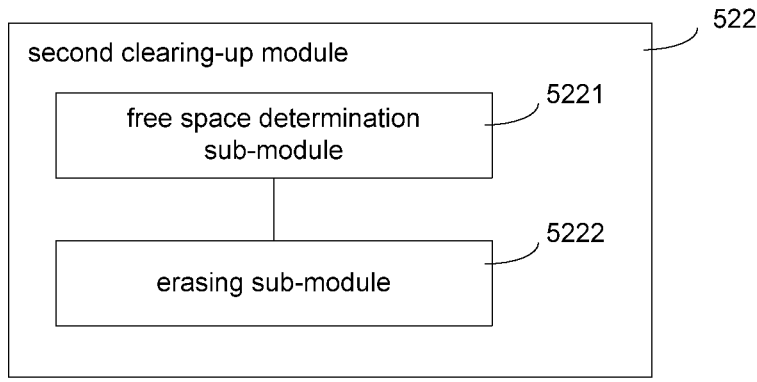
FIG. 9a is a schematic diagram illustrating structure of a second clearing-up module in accordance with an example of the present disclosure.

The second clearing-up module 522 may be implemented with two modes. FIG. 9a is a schematic diagram illustrating structure of the second clearing-up module. Referring to FIG. 9a, the second clearing-up module 522 may include:

a free space determination sub-module 5221, to search for a bit table of the volume in a file system and determine disk space marked as free in the bit table; and an erasing sub-module 5222, to erase the disk space marked as free in the bit table.

Figure 9B:
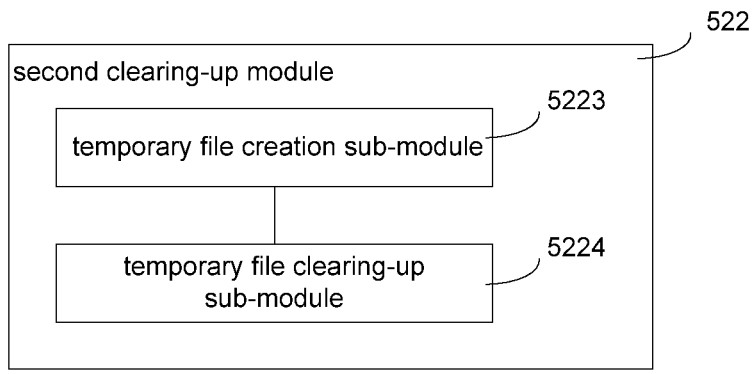
FIG. 9b is a schematic diagram illustrating structure of another second clearing-up module in accordance with an example of the present disclosure.

FIG. 9b is a schematic diagram illustrating another structure of the second clearing-up module. Referring to FIG. 9b, the second clearing-up module 522 may include:

a temporary file creation sub-module 5223, to continuously create temporary files on the volume free space until a failure occurs; and a temporary file clearing-up sub-module 5224, to clear up the temporary files.

Figure 10:
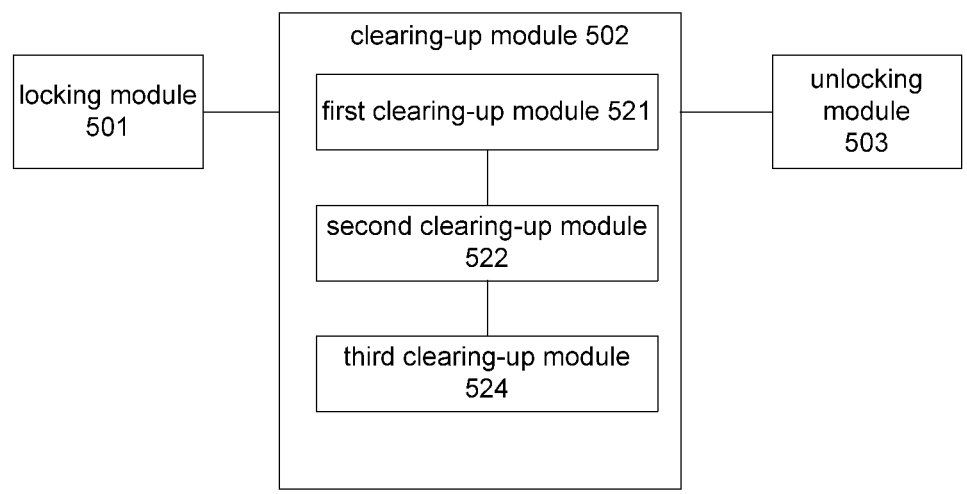
FIG. 10 is a schematic diagram illustrating structure of another device for clearing up a file system in accordance with an example of the present disclosure.

FIG. 10 is a schematic diagram illustrating structure of another structure of a system for clearing up a file system. Referring to FIG. 10, the clearing-up module may further include a third clearing-up module 524, to determine whether the volume is a system disk and clear the pagefile.sys of the volume after determining that the volume is the system disk.

The devices provided by examples of the present disclosure may be designed according to the same idea as that of the methods provided by the example of the present disclosure, which may not be repeated here.

According to the devices provided by the examples of the present disclosure, after the clearing-up instruction is received, the information occupied by the deleted file of the volume and the volume free space may be cleared up, the leakage of the privacy of the user may be avoided and the security of the file system may be enhanced.

All or partial of the above technical schemes provided by examples of the present disclosure may be implemented by instructing hardware (such as a processor of a computer) by instructions of a data processing program. The data processing program may be stored in a readable storage medium. The storage medium may include a medium capable of storing program codes, such as a Read-Only Memory (ROM), a Random Access Memory (RAM), a disk or a Compact Disk (CD).

Furthermore, each function module in each embodiment of the present disclosure may be integrated in a processing unit or may be each independently physical module. In the alternative, two or more than two modules may be integrated in a unit. The integrated unit may be implemented with hardware or implemented by software function units. The function modules in each example may be set on a terminal device or a network node, or respectively set on more than two terminal devices or network nodes.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for clearing up a file system, the method comprising:
   opening and locking a volume according to a clearing-up instruction; wherein the clearing-up instruction indicates the volume which is to be cleared up;
   clearing up garbage information on a disk corresponding to the volume; and
   unlocking the volume after clearing up the garbage information on the disk corresponding to the volume;
   wherein clearing up the garbage information on the disk corresponding to the volume comprises
   determining whether the volume is formatted and whether no file is added or deleted after the volume is formatted; wherein the volume is specified by the clearing-up instructions;
   clearing up volume free space in the disk corresponding to the volume if the volume is formatted and no file is added or deleted after the volume is formatted, and
   clearing up the information occupied by the deleted file in the disk corresponding to the volume and clearing up the volume free space in the disk corresponding to the volume if the volume is not formatted or a file is added or deleted,
   wherein clearing up the volume free space in the disk corresponding to the volume comprises
   continuously creating temporary files on the disk corresponding to the volume to overwrite data on the volume until a failure occurs, and
   clearing up the temporary files;
   the volume free space is space marked as free in a bit table and the information occupied by the deleted file comprises a name of the deleted file, time of the deleted file and content of the deleted file.

2. The method according to claim 1, wherein clearing up the information occupied by the deleted file in the disk corresponding to the volume comprises:
   traversing a Master File Table, MFT, in the volume; and
   clearing up the information occupied by the deleted file in the MFT.

3. The method according to claim 1, wherein clearing up the information occupied by the deleted file in the disk corresponding to the volume comprises:
   traversing a directory entry of the volume; and
   clearing up an entry, in which the first byte of a name of the entry is 0xE5 in the directory entry;
   the entry, in which the first byte of the name of the entry is the 0xE5 in the directory entry is information occupied by the deleted file.

4. The method according to claim 1, wherein clearing up the volume free space in the disk corresponding to the volume comprises:
   searching for a bit table of the volume in a file system; and
   erasing disk space marked as free in the bit table.

5. The method according to claim 1, wherein when the volume is a system disk, the method further comprises:
   clearing up pagefile.sys of the volume.

6. A non-transitory storage medium, storing a data processing program, to execute the method of claim 1.

7. A device for clearing up a file system, the device comprising:
   a locking module, to open and lock a volume according to a clearing-up instruction;
   wherein the clearing-up instruction indicates the volume which is to be cleared up;
   a clearing-up module, to clear up garbage information on a disk corresponding to the volume; and
   an unlocking module, to unlock the volume after the clearing-up module clears up the garbage information; and
   a determination module, to determine whether the volume is formatted and whether no file is added or deleted after the volume is formatted, instruct a second clearing-up module to clear up the volume free space in the disk corresponding to the volume if the volume is formatted and no file is added or deleted after the volume is formatted and instruct the first clearing-up module to clear up the information occupied by the deleted file in the disk corresponding to the volume and instruct the second clearing-up module to clear up the volume free space in the disk corresponding to the volume if the volume is not formatted or a file is added or deleted; wherein the volume is specified by the clearing-up instruction;
   wherein the second clearing-up module comprises
   a temporary file creation sub-module, to continuously create temporary files on the volume free space to overwrite data on the volume until a failure occurs; and
   a temporary file clearing-up sub-module, to clear up the temporary files;
   the volume free space is space marked as free in a bit table and the information occupied by the deleted file comprises a name of the deleted file, time of the deleted file and content of the deleted file.

8. The device according to claim 7, the first clearing-up module comprises:
   a New Technology File System (NTFS) clearing-up sub-module, to traverse a Master File Table (MFT) of the volume in a NTFS file system and clear up the information occupied by the deleted file in the MFT; and
   a File Allocation Table (FAT) clearing-up sub-module, to traverse a directory entry of the volume in a FAT file system and clear up an entry, in which the first byte of a name of the entry is 0xE5 in the directory entry;
   the entry, in which the first byte of the name of the entry is the 0xE5 in the directory entry is information occupied by the deleted file.

9. The device according to claim 7, wherein the second clearing-up module comprises:
- a free space determination sub-module, to search for a bit table of the volume in a file system and determine disk space marked as free in the bit table; and
- an erasing sub-module, to erase the disk space marked as free in the bit table.

10. The device according to claim 7, wherein the clearing-up module further comprises:
- a third clearing-up module, to determine whether the volume is a system disk and clear up pagefile.sys of the volume if the volume is the system disk.

\* \* \* \* \*